(No Model.)

J. C. FLEMING.
NUT LOCK.

No. 541,527. Patented June 25, 1895.

Witnesses
Geo. W. Fleming
John W. Schmidt

Inventor:
John C. Fleming

UNITED STATES PATENT OFFICE.

JOHN C. FLEMING, OF BROOKLYN, NEW YORK.

NUT-LOCK.

SPECIFICATION forming part of Letters Patent No. 541,527, dated June 25, 1895.

Application filed November 12, 1894. Serial No. 528,840. (No model.)

*To all whom it may concern:*

Be it known that I, JOHN C. FLEMING, a citizen of the United States, residing at No. 1150 Bedford avenue, in the city of Brooklyn, county of Kings, and State of New York, have invented a new and useful Nut-Lock, of which the following is a specification.

My invention relates to an improvement in "nut locks," and the object of my invention, is to secure the nut on a bolt, wagon axle, shaft or any other piece of mechanism, so that it cannot become detached or turned off because of vibration or jarring. I attain this object by the mechanism illustrated in the accompanying drawings, in which—

Figure 1:
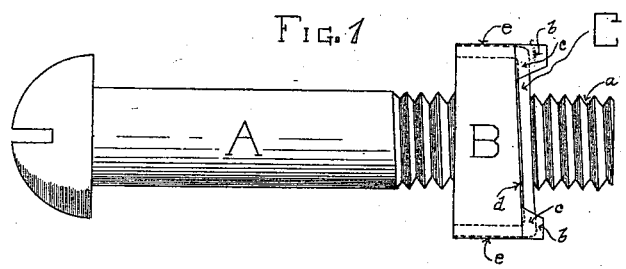
Figure 2:
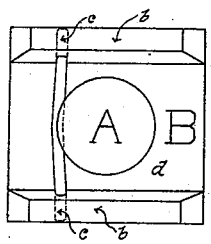
Figure 3:
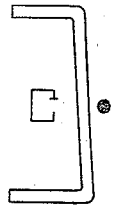

Figure 1 is a longitudinal side elevation of the device applied to a bolt. Fig. 2 is a plan of the same, showing the nut locked to the bolt. Fig. 3 is a view of wire, showing form of same, and also section of same.

Similar letters of reference indicate corresponding parts.

In the drawings "A" represents the bolt. "B" is the nut with shoulders "b" formed on either side of the nut "B," and provided with holes "c," extending through shoulders "b" of nut "B," for the reception of wire "C," which runs parallel with bevel "d," of nut "B," and has its ends bent, so they (the ends of wire "C") lie in slots "e," so as to be out of the way of the wrench, that may be applied to nut "B."

"C" is the wire secured to the nut "B" (as hereinbefore described), and traveling in thread "a" of bolt "A," (when nut "B" is applied to bolt "A,") thus forming a brake to nut "B," whereby it cannot turn off bolt "A," thereby securing nut "B," to bolt "A."

What I claim as new and of my invention is—

The combination of the bolt "A," the nut "B," having shoulders "b," provided with holes "c," opposite each other, and in a line through the body of the bolt "A," the wire C seated in the holes c and engaging the thread a, of the bolt A, the bevel "d," running parallel with thread "a," of bolt "A," where wire "C" is secured in nut "B," and the slots "e," engaging the ends of the wire "C" as set forth.

JOHN C. FLEMING.

Witnesses:
   GEO. W. FLEMING,
   JOHN W. SCHMIDT.